United States Patent [19]
Yoshida

[11] Patent Number: 5,529,397
[45] Date of Patent: Jun. 25, 1996

[54] SEAT SLIDE DEVICE

[75] Inventor: Tadasu Yoshida, Nagoya, Japan

[73] Assignee: Aisin Seiki Kabushiki Kaisha, Japan

[21] Appl. No.: 483,099

[22] Filed: Jun. 7, 1995

[30] Foreign Application Priority Data

Jun. 15, 1994 [JP] Japan .................................. 6-133309

[51] Int. Cl.⁶ ........................... F16C 29/04; F16M 13/00
[52] U.S. Cl. ............................................... 384/47; 248/430
[58] Field of Search ..................... 384/47; 297/216.15; 248/430

[56] References Cited

U.S. PATENT DOCUMENTS

| | | | |
|---|---|---|---|
| 3,759,587 | 9/1973 | Christin | 384/47 |
| 4,068,887 | 1/1978 | Babbs | 297/216 |
| 4,533,107 | 8/1985 | Okazaki et al. | 248/430 |
| 4,756,503 | 7/1988 | Fujita | 248/430 |
| 4,821,991 | 4/1989 | Aihara et al. | 248/430 |
| 4,828,214 | 5/1989 | Kanai et al. | 248/430 |
| 5,028,028 | 7/1991 | Yamada et al. | 248/430 |
| 5,046,698 | 9/1991 | Venier | 248/430 |
| 5,192,045 | 3/1993 | Yamada et al. | 248/430 |
| 5,222,814 | 6/1993 | Boelryk | 384/47 |

FOREIGN PATENT DOCUMENTS 0037726  10/1981  European Pat. Off. .
0076041   4/1983  European Pat. Off. .

Primary Examiner—Thomas R. Hannon
Attorney, Agent, or Firm—Finnegan, Henderson, Farabow, Garrett & Dunner

[57] ABSTRACT

A seat slide device for use in a vehicle includes a lower rail for fixing to a floor of the vehicle and having a generally U-shaped channel cross-section defined by a base arm and side arms, an upper rail for fixing to a seat of the vehicle and slidably supported on the lower rail and having a generally inversely T-shaped channel cross-section defined by a bar and a flange, balls disposed between the lower rail and the upper rail and contacting the bar and a corner portion between the base arm and each side arm, an inward portion formed in an end portion of each of the side arms, an ear portion formed in an end portion of the bar and positional within the inward portion, and projections formed on one of the side arms and the bar and contacting the other of the side arms and the bar.

4 Claims, 3 Drawing Sheets

SEAT SLIDE DEVICE

BACKGROUND OF THE INVENTION

1. Field of the Invention

The present invention relates to a seat slide device for use in an automotive vehicle.

2. Description of the Related Art

Conventional seat slide devices are disclosed in EPC 0,037,726 A1 published on Oct. 14, 1981 and USP 4,756,503 published on Jul. 12, 1988.

Each of the foregoing seat slide devices comprises a lower rail which is fixed to a floor of a vehicle and having a generally U-shaped channel cross-section defined by a base arm and side arms, and an upper rail which is fixed to a seat of the vehicle and having a generally inversely T-shaped channel cross-section defined by a bar and a flange. The upper rail is slidably supported on the lower rail through balls or a roller.

The balls of the former seat slide device (EPC 0,037,726 A1) are disposed between the base arm of the lower rail and the bar of the upper rail so as to contact with corner portions between the base arm and the side arms and angular portions of the bar. In the former device, ear portions which upwardly extend from ends of the bar are encircled by inward portions which inwardly fold from ends of the side arms so as to contact with the inward portions and the side arms. Play in the longitudinal direction and lateral direction of the upper rail relative to the lower rail is prevented by the contact of the balls and the contact of the ear portions.

The roller of the latter seat slide device (U.S. Pat. No. 4,756,503) is disposed between the base arm of the lower rail and the bar of the upper rail so as to contact with a parallel portion of the base arm and a parallel portion of the bar. In the latter device, ear portions which upwardly extend from ends of the bar are encircled by inward portions which are inwardly folded from ends of the side arms so as to contact with the inward portions and the side arms through the projections of shoes which are attached on the ear portions. Play in the longitudinal direction and lateral direction of the upper rail relative to the lower rail is prevented by the contact of the roller and the contact of the shoes.

However, in the former seat slide device, when the upper rail is sliding, a slide resistance of the upper rail relative to the lower rail is increased, because the ear portions contact with the side arms and inward portion.

In the latter seat slide device, the number of component parts increases, because the device needs the roller and shoes.

SUMMARY OF THE INVENTION

It is, therefore, an object of the present invention to provide a seat slide device which overcomes the drawbacks of the related art.

The above object is achieved by a seat slide device for use in a vehicle according to the present invention which a seat slide device for use in a vehicle includes a lower rail for fixing to a floor of the vehicle and having a generally U-shaped channel cross-section defined by a base arm and side arms, an upper rail for fixing to a seat of the vehicle and slidably supported on the lower rail and having a generally inversely T-shaped channel cross-section defined by a bar and a flange, balls disposed between the lower rail and the upper rail and contacting the bar and a corner portion between the base arm and each side arm, an inward portion formed in an end portion of each of the side arms, an ear portion formed in an end portion of the bar and positional within the inward portion, and projections formed on one of the side arms and the bar and contacting the other of the side arms and the bar.

BRIEF DESCRIPTION OF THE DRAWINGS

Additional objects and advantage of the present invention will become more apparent from the following detailed description of preferred embodiment thereof when considered with reference to the attached drawings, in which.

DETAILED DESCRIPTION OF THE PREFERRED EMBODIMENTS

Hereinafter a seat slide device according to a first embodiment of the present invention is explained with reference to FIG. 1 and FIG. 2.

Figure 1:
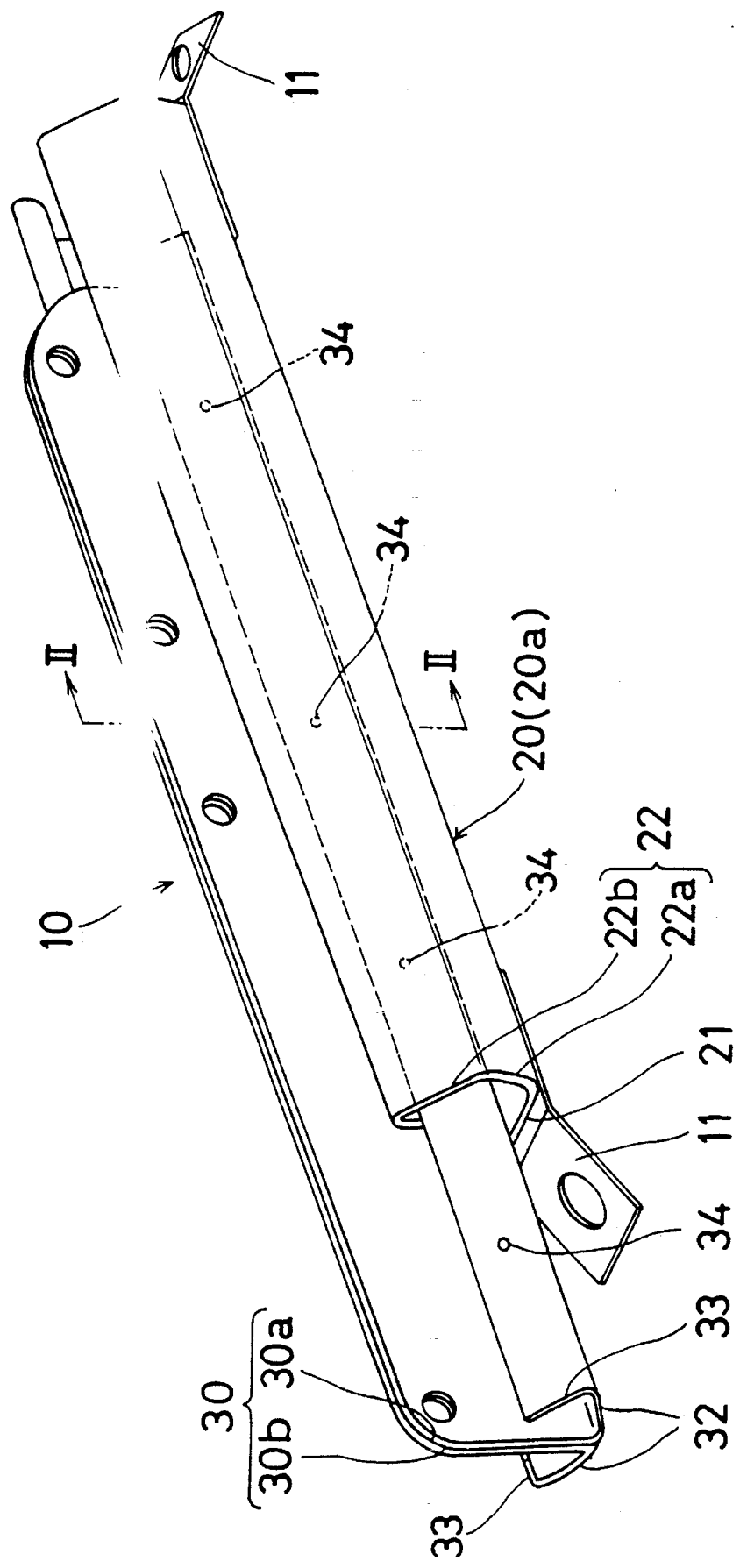
FIG. 1 is a perspective view of a seat slide device according to the present invention.
Figure 2:
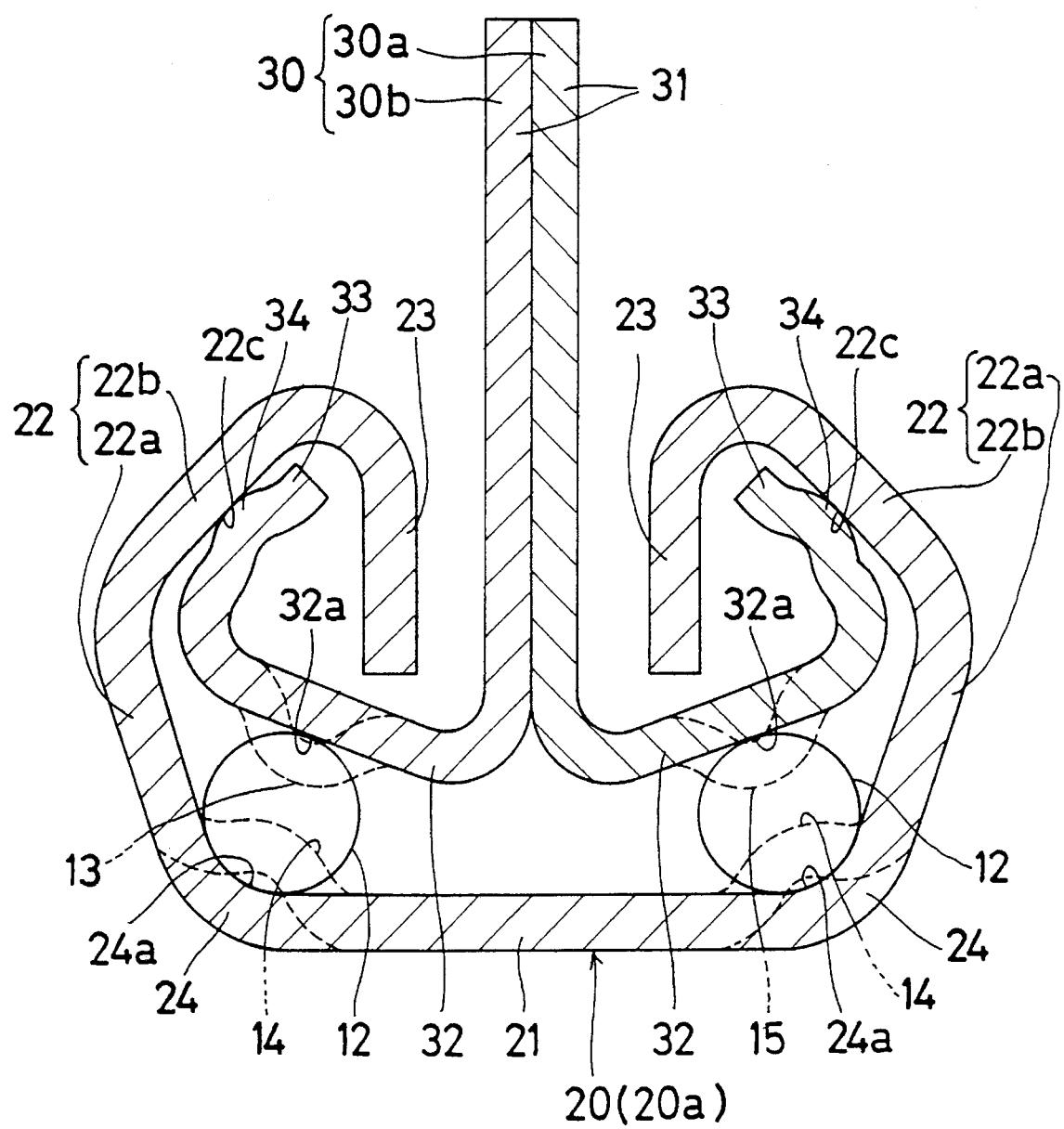
FIG. 2 is a cross-sectional view of a first embodiment taken along line II—II in FIG. 1.

As shown in FIG. 1 and FIG. 2, a seat slide device 10 comprises a lower rail 20 which is fixed to a floor of a vehicle (not shown) via brackets 11, an upper rail 30 which is fixed to a seat of the vehicle (not shown) and a pair of balls 12. The upper rail 30 is slidably supported on the lower rail 20 via the balls 12.

The lower rail 20 is formed into a single plate 20a and has a generally U-shaped channel cross-section defined by a base arm 21 and opposite side arms 22. Inward portions 23 are formed to the side arms 22 in such a manner that ends of side arms 22 are turned inwardly toward the base arm 21. The upper rail 30 is formed by a pair of plates 30a, 30b which have an L-shaped and an inversely L-shaped cross-sections, respectively, and is constituted into a generally inverted T-shaped channel cross-section. Each plate 30a,30b (the upper rail 30) has a bar 32 and a flange 31. Ear portions 33 are formed to the bar 32 so as to extend in the upward direction in such a manner that ends of the bar 32 are turned.

The bar 32 of the upper rail 30 is disposed between the side arms 22 of the lower rail 20 so as to confront the base arm 21 of the lower rail 20. The ear portions 33 of the bar 32 are encircled by the inward portions 23 of the side arms 22. The flange 31 of the upper rail 30 is arranged between the inward portions 23 so as to extend in the upward direction. The balls 12 are disposed between the base arm 21 of the lower rail 20 and the bar 32 of the upper rail 30.

The side arms 22 have a "<"- shaped and an inversely "<"- shaped cross-sections defined by first angular portions 22a and second angular portions 22b. The ear portions 33 are inclined relative to the bar 32 so as to be parallel with the second angular portions 22b. The bar 32 is inclined relative to the base arm 21 so as to press the balls 12 which is disposed between the base arm 21 and the bar 32 outward. A plurality of lengthwise spaced projections 34 are formed in the ear portions 33 so as to project toward the second angular portions 22b. Each projection 34 is shaped into a hemisphere.

Each ball 12 is in contact with a surface 32a of the bar 32 and a surface 24a of corner portion 24 which is formed between the base arm 21 and the side arms 22 of the lower rail 20. The projections 34 are in point contact with a surface 22c of the second angular portions 22b. Play in the longitudinal direction and lateral direction of the upper rail 30 relative to the lower rail 20 is prevented by the contact of the balls 12 and the contact of the projections 34.

Stoppers 13,14 are formed at longitudinal ends of the upper rail 30 and the lower rail 20 in such a manner that the corner portions 24 of the lower rail 20 and the bar 32 of the upper rail 30 are positional so as to project from the surface 24a and surface 32a. The stoppers 13,14 are used to prevent escape of the balls 12 from the upper rail 30 and lower rail 20. The stoppers 13,14 contact with the balls 12, and therefore a slide range of the upper rail 30 relative to the lower rail 20 is defined.

Hereinafter a seat slide device according to a second embodiment of the present invention is explained with reference to FIG. 3.

Figure 3:
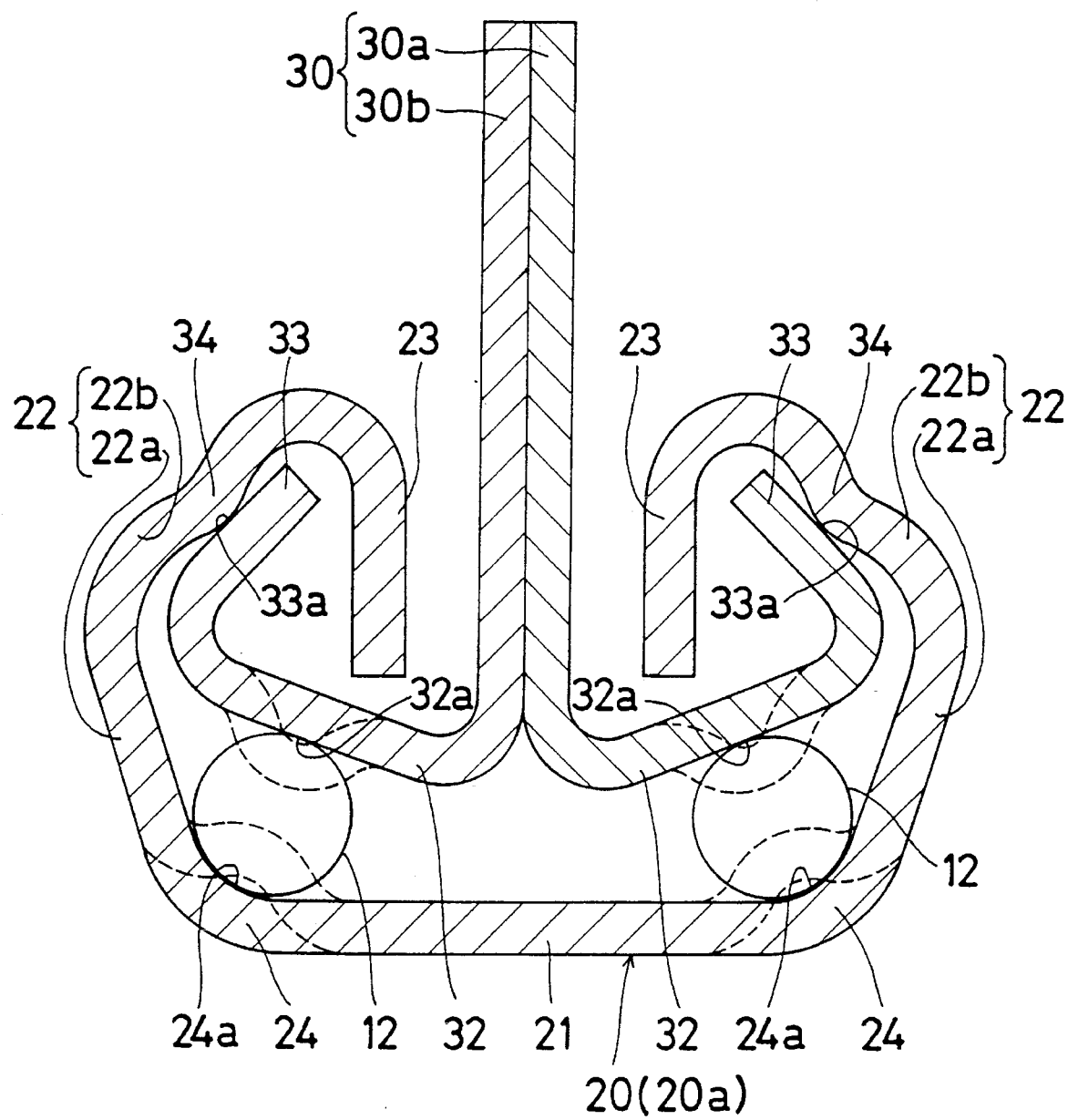
FIG. 3 is a cross-sectional view of a second embodiment.

As shown in FIG. 3, a plurality of lengthwise spaced projections 34 are formed to the second angular portions 22b so as to project toward the ear portions 33. Each projection 34 is shaped into a hemisphere. The projections 34 are in point contact with a surface 33a of the ear portions 33.

The preferred embodiments described herein are therefore illustrative and not restrictive, the scope of the invention being indicated in the appended claims and all variations which come within the meaning of the claims are intended be embraced therein.

What is claimed is:

1. A seat slide device for use in a vehicle, comprising:

a lower rail for fixing to a floor of said vehicle, said lower rail having a generally U-shaped channel cross-section defined by a base arm and side arms;

an upper rail for fixing to a seat of said vehicle and slidably supported on said lower rail, said upper rail having a generally inversely T-shaped channel cross-section defined by a bar and a flange;

balls disposed between said lower rail and said upper rail, said balls contacting said bar and a corner portion between said base arm and said each side arm;

an inward portion formed in an end portion of each of said side arms;

an ear portion formed in an end portion of said bar and positional within said inward portion; and projections formed on one of said side arms and said bar, said projections contacting the other of said side arms and said bar.

2. A seat slide device as set forth in claim 1, wherein anguler portions are formed in said side arms and contact said projections.

3. A seat slide device as set forth in claim 1, wherein said ear portion is inclined relative to said bar.

4. A seat slide device as set forth in claim 1, wherein said bar is inclined relative to said base arm.

\* \* \* \* \*